United States Patent [19]

Fowler

[11] 4,335,295
[45] Jun. 15, 1982

[54] METHOD OF MARKING A METAL DEVICE

[76] Inventor: Gary J. Fowler, 121 31st St., Manhatten Beach, Calif. 90266

[21] Appl. No.: 37,341

[22] Filed: May 9, 1979

[51] Int. Cl.$^3$ .............................................. B23K 27/00
[52] U.S. Cl. ............................. 219/121 LM; 156/643
[58] Field of Search ......... 219/121 L, 121 LM, 69 M, 219/121 LA, 121 LE, 121 LF, 121 LG, 121 LN; 346/76 L; 109/25; 156/643; 427/7, 53.1; 430/945, 323; 250/483

[56] References Cited

U.S. PATENT DOCUMENTS

| | | | |
|---|---|---|---|
| 2,293,100 | 8/1942 | Baumgold | 125/30 R X |
| 2,989,385 | 6/1961 | Gianola et al. | 156/643 |
| 3,663,793 | 5/1972 | Petro et al. | 219/121 LM |
| 3,682,729 | 8/1972 | Gukelberger, Jr. et al. | 156/643 |
| 3,992,208 | 11/1976 | Nagata et al. | 430/323 X |
| 4,032,861 | 6/1977 | Rothrock | 219/121 L X |
| 4,072,768 | 2/1978 | Fraser et al. | 430/945 X |
| 4,087,281 | 5/1978 | Toda et al. | 219/121 LM X |
| 4,128,752 | 12/1978 | Gravel | 219/121 L |
| 4,146,792 | 3/1979 | Stenzel et al. | 250/483 X |

OTHER PUBLICATIONS

Weiner, M. J., "Product Marking with Nd:YaG and $CO_2$ Lasers", SME Technical Paper MR76-853 at Latest Uses of Lasers in Manufacturing Conference, Culver City, Ca., 1976.

*Primary Examiner*—C. L. Albritton
*Attorney, Agent, or Firm*—W. Edward Johansen

[57] ABSTRACT

The present invention is a method of marking a metal device with an identification symbol or a serial number which is not detectable by a visual examination. The method of marking includes the steps of locally heating a specified area of the metal so that its microstructure is altered. For example, a laser, the intensity of which has been adjusted so as to maintain a designated area at a temperature within an appropriate temperature range for the particular metal, may be used to trace out either an identification symbol or serial number. The method is used in combination with the step of etching away the surface area of the metal device which includes both unaltered microstructure and altered microstructure with a selected chemical etching solution that will etch away the altered microstructure at a different rate than the unaltered microstructure thereby exposing the mark.

2 Claims, 8 Drawing Figures

U.S. Patent   Jun. 15, 1982   4,335,295
Fig. 1.
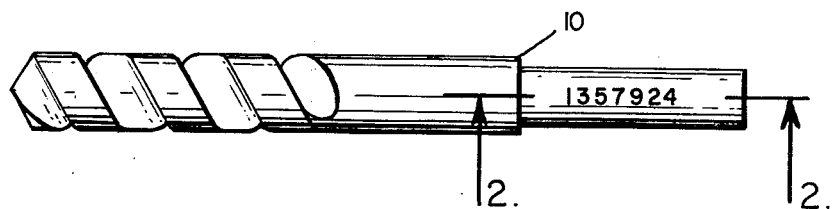
Fig. 2.
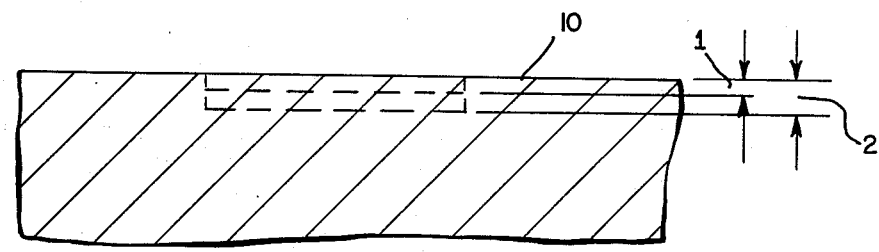
Fig. 3.   Fig. 4.   Fig. 5.
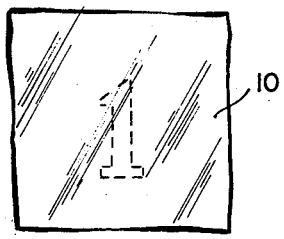 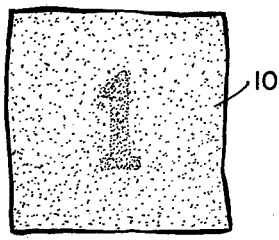 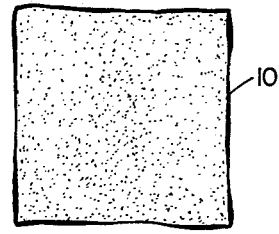
Fig. 6.   Fig. 7.   Fig. 8.
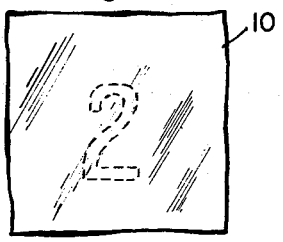 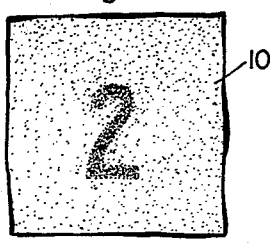 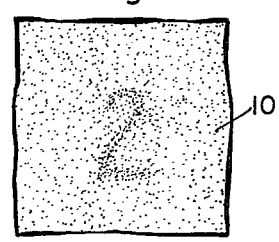

METHOD OF MARKING A METAL DEVICE

BACKGROUND OF THE INVENTION

1. Field of the Invention

The present invention relates to a method of marking a metal device with an identification symbol or a serial number that is not detectable by a visual or microscopic examination and more particularly to a method of marking a metal device which changes the surface microstructure in the shape of the identification symbol or serial number.

2. Description of the Prior Art

In the past various methods have been used to mark metal devices for the purposes of services and maintenance, trademark usage, theft prevention and quality control with a stamped or engraved identification symbol or serial number. Some of these methods of marking include engraving, stamping, etching and casting. The purposes of the identification symbol or serial number are generally achieved by these methods of marking. However, in the case of theft of the metal device where a thief may obliterate the identification symbol or serial number, the purpose of marking is not achieved.

There are many techniques which have been used to place inconspicuous identification symbols and serial numbers on metal devices. These techniques include high resolution laser engraving and photo-etching. Each of these techniques leaves a mark which a thief of the metal device can find by a visual or microscopic examination. If the thief finds the mark, he will obliterate it. Furthermore, wear will also obliterate these identification symbols and serial numbers.

U.S. Pat. No. 3,588,439, entitled High Resolution Laser Engraving Apparatus, issued to Mary E. Heller and Hendrik J. Gerritsen on June 28, 1971, teaches a pulsed laser which illuminates an entire given area of the surface of a member to be engraved with coherent light which varies in relative intensity from point to point over its cross section in accordance with a predetermined pattern. It has been found that if the absolute intensity and time of duration of the pulse of coherent light are proper, it is possible to obtain engravings in which details of the order of 2 microns in the engraved pattern can be resolved. This makes it possible to engrave not only pictorial patterns, but also hologram patterns.

U.S. Pat. No. 4,128,752, entitled Laser Micromachining Apparatus, issued to Joseph A. M. Gravel on Dec. 5, 1978, teaches a laser micromachining apparatus which is capable of producing a particular machining pattern on a workpiece. The laser micromachining apparatus includes a laser device for producing a laser beam, a beam expander unit positioned to receive the laser beam and transforms it into a beam of larger and substantially uniform cross-sectional area and a mask device in the path of the laser beam after the beam expander unit. The mask device includes a diffraction pattern which corresponds to the particular machining pattern and which includes a plurality of different individual perforations. The apparatus also includes a converging lens system which focuses the laser beam and which is positioned adjacent to the mask device in the path of the beam. The laser micromachining apparatus also includes image optics in the path of the laser beam after the converging lens and system and the mask device for imaging the whole of the diffraction pattern of the mask onto the workpiece. The converging lens is a spherical lens superposing the diffraction pattern of the different individual perforations of the mask at the entrance pupil of the image optics to provide a minimum size imaging unit for reproducing the diffraction pattern on the workpiece.

U.S. Pat. Nos. 4,128,753 and 3,617,702 are other patents which teach laser apparatus for use with metal devices.

The technique of photo-etching includes the steps of coating the surface of the metal device with a photo-resistance material, covering the surface with a mask which has the identification symbol or serial number exposed, shining a light onto the mask thereby exposing the unmasked surface area, and using a chemical etch which marks the surface of the metal device.

SUMMARY OF THE INVENTION

In view of the foregoing factors and conditions characteristic of the prior art, it is a primary object of the present invention to provide a method of marking a metal device with identification symbol or a serial number that is not detectable by a visual or microscopic examination.

It is another object of the present invention to provide a method of marking a metal device which alters the microstructure of the surface of the metal device within a designated area in the shape of an identification symbol or a serial number so that a selected chemical etch may expose the identification symbol or serial number at a critical time.

It is still another object of the present invention to provide a method of marking a metal device which a thief of the metal device cannot locate and obliterate and which the owner and prosecuting authorities can expose at a critical time in order to identify the ownership of the metal device.

In accordance with an embodiment of the present invention, a method of marking a metal device that is subject to wear with an identification symbol or a serial number that is not detectable by a visual or microscopic examination is described.

The method of marking includes the steps of locally heating a specified area of the metal so that its microstructure is altered. For example, a laser, the intensity of which has been adjusted so as to maintain a designated area at a temperature within an appropriate temperature range for the particular metal, is used to trace out either an identification symbol or a serial number. When it is necessary to identify the identification symbol or serial number, this method is used in combination with the step of etching away the surface layer of the metal device which includes both unaltered microstructure and altered microstructure with a chemical etching solution that will etch away the altered microstructure at a different rate than the unaltered microstructure thereby exposing the mark.

The features of the present invention which are believed to be novel are set forth with particularity in the appended claims.

Other objects and many of the attendant advantages of this invention will be more readily appreciated as the same becomes better understood by reference to the following detailed description and considered in connection with the accompanying drawing in which like reference symbols designate like parts throughout the figure.

DESCRIPTION OF THE DRAWING

FIG. 1 is a perspective drawing of a drill bit which has been marked with a serial number in accordance with the method of present invention so that the serial number is not detectable by a visual examination until it has been treated with a particular chemical etching solution.

FIG. 2 is a partial longitudinal cross-sectional view of the drill bit of FIG. 1 along the line 2—2 of FIG. 1.

FIG. 3 is a partial plan view of the drill bit of FIG. 1 where its entire surface area has been polished so that the drill bit is in its finished condition.

FIG. 4 is a partial plan view of the drill bit of FIG. 1 where a particular chemical etching solution has been applied to the number "1" of the serial number and the surrounding surface area in order to expose the number "1".

FIG. 5 is a partial plan view of the drill bit of FIG. 1 where the previously etched surface area of the drill bit has been polished and has had the same chemical etching solution applied so that the number "1" of the serial number has disappeared.

FIG. 6 is a partial plan view of the drill bit of FIG. 1 where its entire surface area has been polished so that the drill bit is in its finished condition.

FIG. 7 is a partial plan view of the drill bit of FIG. 1 where a particular chemical etching solution has been applied to the number "2" of the serial number and the surrounding surface area in order to expose the number "2".

FIG. 8 is a partial plan view of the drill bit of FIG. 1 where the previously etched surface area of the drill bit has been polished and has had the same chemical etching solution applied so that the number "2" of the serial number is still visible.

DESCRIPTION OF THE PREFERRED EMBODIMENT

In order to best understand the present invention it is necessary to read a description of its preferred embodiment in conjunction with the accompanying drawing. Referring to FIG. 1 a drill bit 10 has been marked with a serial number which includes the numbers "1" and "2" in it. The numbers are shown in dash lines because they are undetectable by a visual examination. These numbers have been placed on the surface area of the drill bit by a heating apparatus which has locally heated a designated area on a surface of the drill bit 10 so that the microstructure of the surface of the drill bit 10 has been altered in order that a selected chemical etching solution can etch away the altered microstructure of the designated area at a different rate than the rest of the surface of the drill bit 10.

The physical properties of carbon and alloy steels which enable this invention to work are well known. Metallographic etching encompasses all processes used to reveal particular structural characteristics of a metal that are not evident in the surface as polished or as fabricated condition. In addition, etching can be used for phase or microstructure identification. The principle of etching or preferential attack (different rates of etching depending on the phases in the microstructure) or preferential staining of one or more phases applies because of differences in orientation and microstructure. Chemical etching is accomplished by immersing the specimen in or swabbing it with a suitable etchant until the required structure is revealed. If the etching procedure calls for swabbing, the surface of the specimen can be swabbed with a tuft of cotton saturated with the etchant.

Macroscopic examination differs from microscopic examination in that the former employs very low magnifications and is used for the investigations of defects or identification symbols such as a serial number and structure of a large area as opposed to a microscopic portion of that area. If the surface of the specimen is of primary interest, the only steps of preparation required are removing any paint and degreasing the specimen prior to etching.

Nital is by far the most widely used etchant for microetching of carbon and alloy steels because it produces the maximum contrast between pearlite and cementite or ferrite network. Nital also develops ferrite boundaries in structures consisting of martensite and ferrite. Picral reveals maximum detail in pearlite, untempered and tempered martensite, and bainite and it differentiates ferrite, martensite and massive carbide by coloration. Super picral provides good resolution of carbide structures. The addition of hydrochloric acid to picral brings about radical changes in the etching behavior of picral, the most significant of which is the ability to reveal in untempered and tempered martensite the outlines of prior austenite grains. Other etchants are available to provide differential etching rates for different microstructures of metal alloys.

Referring to FIG. 2 in conjunction with FIG. 1 the drill bit 10 is formed from a steel alloy which has a pearlitic microstructure. In the preferred embodiment a serial number is applied to a laser, the intensity of which is adjusted so that it can maintain a temperature in the designated area in the shape of "1" in the range of 1000° C. to 1100° C. The microstructure of the steel will transform from a pearlitic microstructure to a austenitic microstructure. After the laser has passed over the area, the steel will cool rapidly and its microstructure will change from austenite to martensite. The laser may be used to trace out an entire serial number. Referring still to FIG. 2 the intensity of laser may also be adjusted to a higher level in order to heat up a deeper layer of the surface in the steel of the drill bit 10. This can best be seen by referring to the number "2" in FIG. 2.

Other apparatus for heating may be used in place of the laser. These apparatus include an arc for heating the steel in a localized area. The function of the apparatus for heating is to produce a local thermal change in the surface of the metal device.

The inventor believes that the laser, such as the one taught in U.S. Pat. No. 3,588,439, which has been used for high resolution engraving is suitable for this application of tracing out a serial number so long as the intensity of the laser is maintained so that the surface area of serial area changes its microstructure. The precise control that a laser provides enables the inventor to mark a serial number on the surface area of metal device which does not bear the scar of either engraving or melting of the surface area.

Referring to FIG. 3 in conjunction with FIG. 1 and FIG. 2 the number "1" in the serial number has been traced onto the surface area of the drill bit 10 by a laser the intensity of which was maintained for a duration so that the surface depth of the number "1" is one-thousandth of an inch (0.001"). The drill bit 10 can be polished so that there is no trace of the heated surface area.

Referring to FIG. 4 an etchant is applied to the surface area about the number "1". The etchant differentially etches away the surface layer thereby exposing the number "1".

Referring to FIG. 5 the surface area that had been etched has been polished and etched again with the same etchant. The etchant etches away this layer uniformly. The number "1" is no longer on the surface of the drill bit 10.

Referring to FIG. 6 in conjunction with FIG. 1 and FIG. 2 the number "2" in the serial number has been traced onto the surface area of the drill bit 10 by a laser the intensity of which was maintained for a duration so that the surface depth of the number "2" is two-thousandths of an inch (0.002"). The drill bit 10 is polished so that there is no trace of the heated surface area.

Referring to FIG. 7 an etchant is applied to the surface area about the number "2". The etchant differentially etches away the surface layer thereby exposing the number "2".

Referring to FIG. 8 the surface area that had been etched has been polished and etched again with the same etchant. The etchant etches away this layer differentially so that the number "2" is again exposed.

Referring to FIG. 5 in conjunction with FIG. 8 it can be seen that the intensity of the laser and the duration of its use determines the depth that the microstructure has been altered. The manufacturer can make this determination on the basis of how much wear the part will receive.

From the foregoing it can be seen that a method for marking a metal device with a invisible serial number has been described. The invisible serial number will frustrate a thief who has stolen the metal device and attempts to alter or obliterate the serial number. The application of the etchant to the serial number will cause it to appear at a critical time so both the owner of the metal device and the judicial system can prove ownership thereof.

Accordingly it is intended that the foregoing disclosure and showing made in the drawing shall be considered only as an illustration of the present invention. Furthermore, it should be noted that the sketches are not drawn to scale and that distances of and between the various figures are not to be considered significant. The invention will be set forth with particularity in the appended claims.

What is claimed is:

1. A method of marking a metal device, which has been formed from a metal with alloying materials with an identification symbol or a serial number that is not detectable by a visual examination comprising the steps of:
    a. locally heating a designated area on the surface of the metal device to a temperature in the range of 1000° C. to 1100° C. so that the microstructure of the surface of the metal device is altered; and
    b. using a selected chemical etching solution to etch away the altered microstructure in the designated area at a different rate than the unaltered microstructure outside the designated area thereby exposing the designated area.

2. A method of marking a metal device with an identification symbol or a serial number according to claim 1 wherein said step of locally heating the metal device is done by a laser the intensity of which has been adjusted so that it can maintain the designated area on the surface of the metal device at temperature within an appropriate temperature range and which traces out either an identification symbol or a serial number.

* * * * *